United States Patent
Chen et al.

(10) Patent No.: US 9,454,944 B2
(45) Date of Patent: Sep. 27, 2016

(54) DISPLAY APPARATUS AND BACKLIGHT DRIVING MODULE

(71) Applicant: Ye Xin Technology Consulting Co., Ltd., Hsinchu (TW)

(72) Inventors: Hsin-Huang Chen, Hsinchu (TW); Chen-Sheng Lee, Hsinchu (TW); Chia-Ming Hsu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/589,743

(22) Filed: Jan. 5, 2015

(65) Prior Publication Data

US 2016/0155417 A1 Jun. 2, 2016

(51) Int. Cl.
*G09G 3/34* (2006.01)
*G09G 5/10* (2006.01)
*H05B 33/08* (2006.01)

(52) U.S. Cl.
CPC .............. *G09G 5/10* (2013.01); *H05B 33/083* (2013.01); *H05B 33/089* (2013.01); *H05B 33/0815* (2013.01); *G09G 2320/0626* (2013.01)

(58) Field of Classification Search
CPC .............. G09G 3/3406; G09G 3/342; G09G 2320/0233; G09G 3/006; G09G 2320/0626; G09G 2330/08; G09G 2330/04; G09G 3/3413; G09G 3/36; G09G 2320/0242; G09G 2320/0646; G09G 3/22; H05B 33/0815; H05B 33/0827; H05B 33/0851; H05B 33/0845; H05B 33/0869; H05B 33/0893; H05B 37/03; H05B 37/036
USPC .............. 345/102, 690; 349/61–70; 362/561; 324/414; 315/121–122, 128, 186, 315/192–193, 291, 313
See application file for complete search history.

(56) References Cited

U.S. PATENT DOCUMENTS

| 8,344,661 | B2* | 1/2013 | Hsu | H05B 33/0815 315/291 |
|---|---|---|---|---|
| 2007/0080911 | A1* | 4/2007 | Liu | G09G 3/342 345/82 |
| 2010/0328370 | A1* | 12/2010 | Takata | G09G 3/342 345/694 |
| 2011/0133645 | A1* | 6/2011 | Kuo | H05B 33/0812 315/77 |
| 2013/0050174 | A1* | 2/2013 | Kim | G09G 3/006 345/212 |
| 2014/0333204 | A1* | 11/2014 | Zhang | G09G 3/00 315/119 |

FOREIGN PATENT DOCUMENTS

TW 201315285 A1 4/2013

* cited by examiner

*Primary Examiner* — Hong Zhou
(74) *Attorney, Agent, or Firm* — Zhigang Ma

(57) ABSTRACT

A display apparatus includes a display panel, a display driving module, a backlight module, and a backlight driving module. The backlight module includes a plurality of illumination units. The backlight driving module includes a driving circuit, a plurality of switch units, and a plurality of detecting units. Each of the switch units connects to exactly one of the illumination units, and each of the detecting units connects to exactly one of the illumination units and two of the illumination units simultaneously. When the illumination unit connected to the switch unit corresponding to the detecting unit is damaged, the detecting unit controls the connected switch unit to be turned off for cutting off an electrical connection between the driving circuit and the illumination unit corresponding to the connected switch unit, and the remaining illumination units continue to emit light.

12 Claims, 3 Drawing Sheets

DISPLAY APPARATUS AND BACKLIGHT DRIVING MODULE

CROSS-REFERENCE TO RELATED APPLICATIONS

This application claims priority to Taiwanese Patent Application No. 103141566 filed on Dec. 1, 2014, the contents of which are incorporated by reference herein.

FIELD

The subject matter herein generally relates to a display apparatus and a backlight driving module.

BACKGROUND

A display apparatus includes a backlight module and a backlight driving chip. The backlight module includes a plurality of light emitting diodes (LEDs) arranged in strings. The backlight driving chip respectively outputs a specified voltage to each of the strings. The backlight driving chip may be damaged when one LEDs in the string is broken.

BRIEF DESCRIPTION OF THE FIGURES

Implementations of the present technology will now be described, by way of example only, with reference to the attached figures.

DETAILED DESCRIPTION

Figure 1:
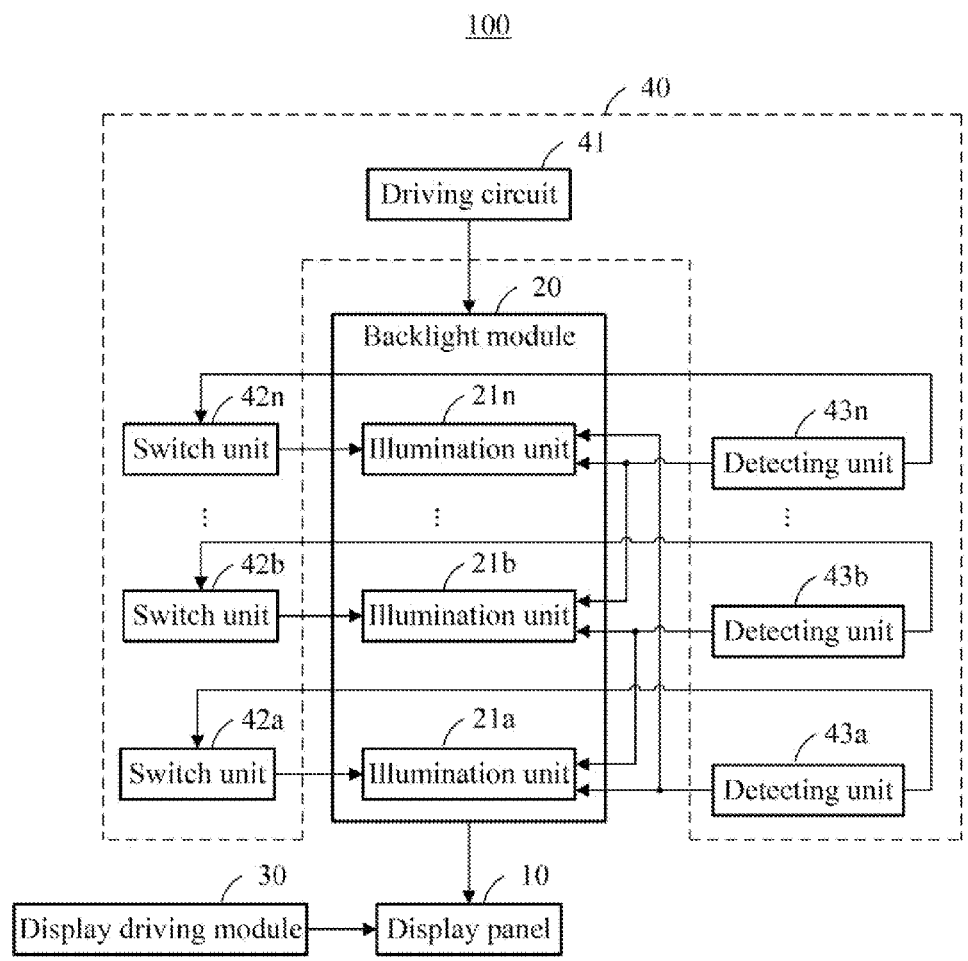
FIG. 1 is a block diagram view of an embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like.

The present disclosure is described in relation to a display apparatus for preventing damage to a driving circuit.

FIG. 1 illustrates a display apparatus 100 of the embodiment. The display apparatus 100 includes a display panel 10, a backlight module 20, a display driving module 30, and a backlight driving module 40.

The display panel 10 displays images.

The backlight module 20 provides plane light to the display panel 10. The backlight module 20 includes a plurality of illumination units 21a-21n.

The display driving module 30 drives the display panel 10 to display images.

The backlight driving module 40 drives the illumination units 21a-21n of the backlight module 20 to emit plane light. The backlight driving module 40 includes a driving circuit 41, a plurality of switching units 42a-42n corresponding to the illumination units 21a-21n in an one-to-one relationship, and a plurality of detecting units 43a-43n corresponding to the corresponding to the illumination units 21a-21n in a one-to-one relationship.

The driving circuit 41 respectively outputs driving voltage to the illumination units 21a-21n. The driving circuit 41 includes a feedback terminal. In at least one embodiment, the driving circuit 41 is an integrated circuit. In other embodiments, the driving circuit 41 includes a plurality of feedback terminals corresponding to the illumination units 21a-21n in a one-to-one relationship.

Each of the switching units 42a-42n is capable of establishing or cutting off an electronic connection between the driving circuit 41 and the corresponding illumination unit 21a-21n. Each of the switching units 42a-42n connects between the driving circuit 41 and one of the corresponding illumination units 21a-21n.

Each of the detecting units 43a-43n compares voltages of two adjacent of the illumination units 21a-21n for controlling the corresponding switching unit 42a-42n. Each of the detecting units 43a-43n includes an output terminal, a first input terminal, and a second input terminal Each of the output terminals of the detecting units 43a-43n electrically connects to the corresponding switching units 42a-42n. The first input terminals of the detecting units 43a-43n electrically connect to the corresponding illumination unit 21a-21n respectively. The second input terminals of the detecting units 43a-43n electrically connect to the illumination units 21b-21a respectively. In at least one embodiment, the output terminal of the detecting unit 43i electrically connects with the corresponding switch unit 42i, the first input terminal of the detecting unit 43i electrically connects to the corresponding illumination unit 21i, and the second input terminal electrically connects to the illumination unit 21i+1. The output terminal of the detecting terminal 43n electrically connects to the switching unit 42n, the first input terminal of the detecting unit 43n electrically connects to the illumination unit 21n, and the second input terminal of the detecting unit 43n electrically connects to the illumination unit 21a. When the voltage of the corresponding illumination unit 21a is lower than the voltage of the adjacent illumination unit 21b, the detecting unit 43a generates a first control signal for cutting off the electrical connection between the driving circuit 41 and the corresponding illumination unit 21a. When the voltage of the corresponding illumination unit 21a is equal to the voltage of the adjacent illumination unit 21b, the detecting unit 43a generates a second control signal for establishing the electrical connection between the driving circuit 41 and the corresponding illumination unit 21a. The first control signal is a logic high level signal, and the second control signal is a logic low level signal.

First ends of the illumination units 21a-21n electrically connect to the driving circuit 41 respectively, and second ends of the illumination units 21a-21n simultaneously are electrically connected to the feedback terminal of the driving circuit 41. In other embodiments, the second ends of cathode terminal of the illumination units 21a-21n electrically connect to the feedback terminals respectively.

Figure 2:
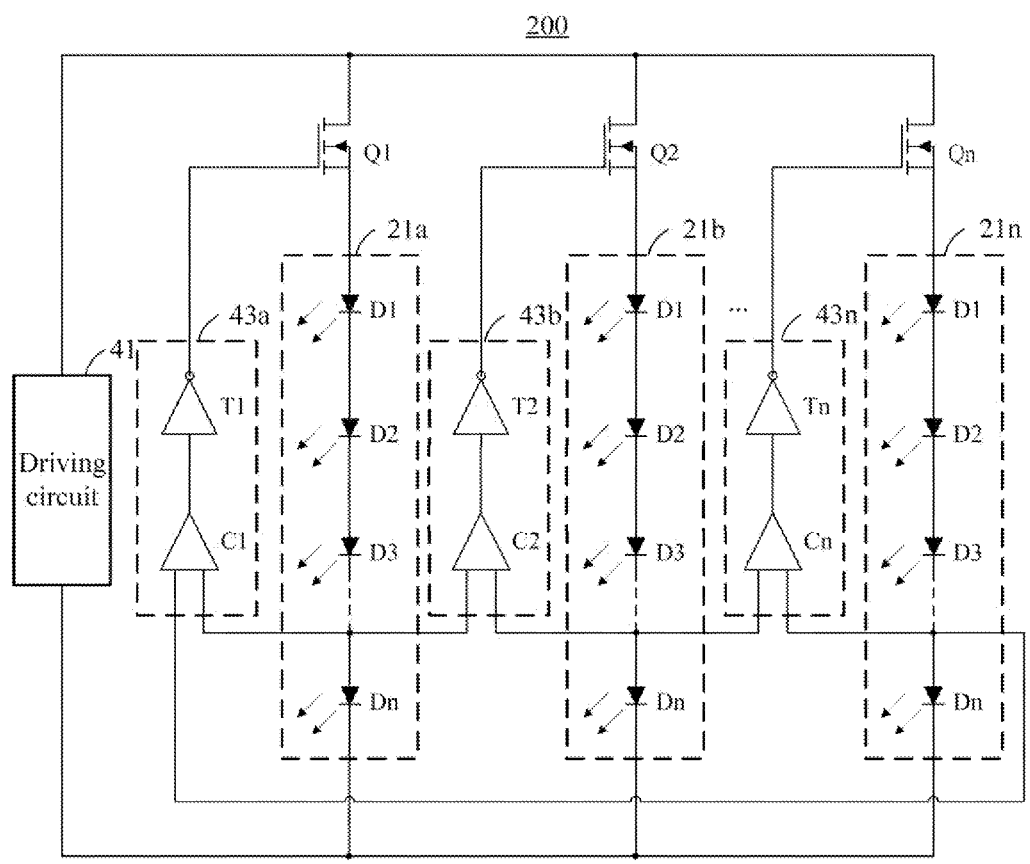
FIG. 2 is a circuit diagram view of an embodiment of the display apparatus of FIG. 1.

FIG. 2 illustrates that the driving circuit 41 of the display apparatus 200 includes a feedback terminal. Each of the illumination units 21a-21n includes a plurality of light emitting diodes (LEDs) D1-Dn in series. An anode of the LED D1 of a specified illumination unit 21i is electrically connected to the feedback terminal, and a cathode of the LED Dn in the specified illumination unit 21i is electrically connected to the driving circuit 31.

The switching units 42a-42n include a plurality of transistors Q1-Qn which correspond to the illumination units 21a-21n in a one-to-one relationship. A gate of a specified transistor Qi is electrically connected to the corresponding detecting unit 43i. A source of the specified transistor Qi is electrically connected to the corresponding illumination unit 21i. A drain of the specified transistor Qi is electrically connected to the driving circuit 41. In at least one embodiment, the transistors Q1-Qn are n-channel enhancement type metal oxide semiconductor field effect transistor.

The detecting units 43a-43n include a plurality of inverters T1-Tn and a plurality of comparators Ca-Cn which respectively correspond to the illumination units 21a-21n in an one-to-one relationship. Specified detecting units 43i include a specified inverter Ti and a specified comparator Ci. An output terminal of the specified inverter Ti is electrically connected to the gate of the specified transistor Qi. An input terminal of the specified inverter Ti is electrically connected to an output terminal of the comparator Ci. A first input terminal of the comparator Ci is electrically connected to the anode of the LED Dn of the specified illumination unit 21i. A second input terminal of the comparator Ci is electrically connected to the anode of the LED Dn of the illumination unit 21i+1.

Figure 3:
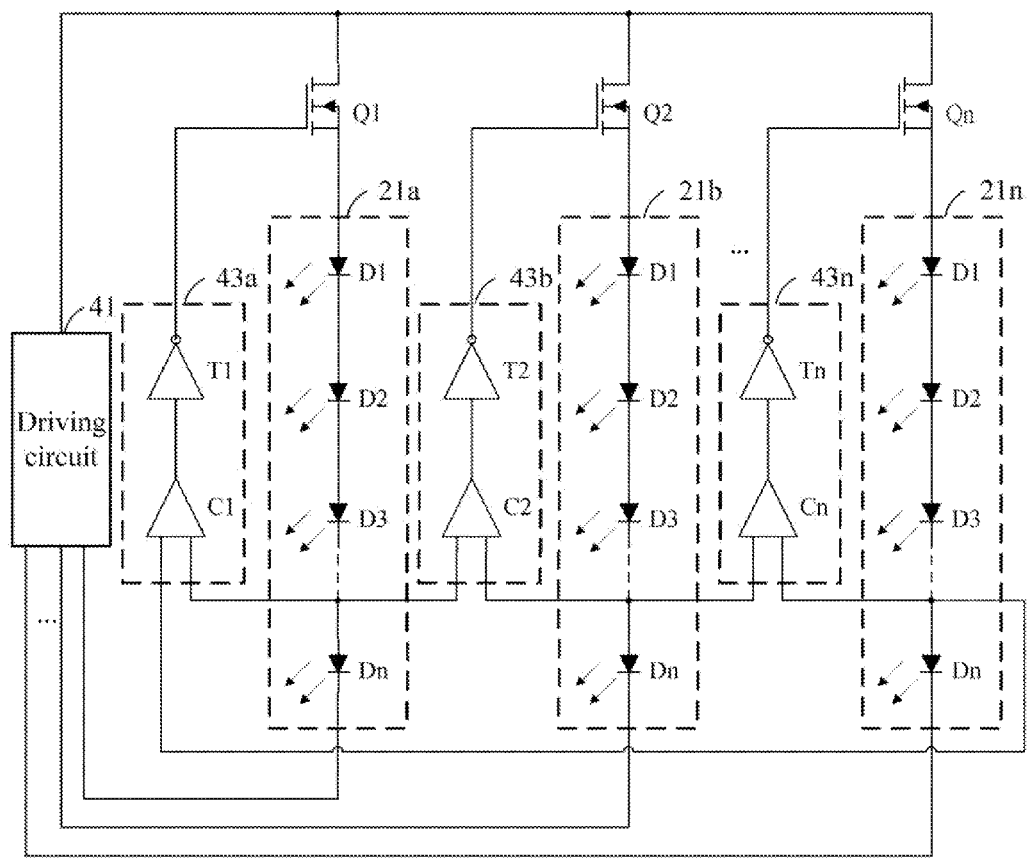
FIG. 3 is a circuit diagram view of another embodiment of the display apparatus of FIG. 1.

FIG. 3 illustrates a second embodiment of the display apparatus 300. The structure of the display apparatus 300 is similar to the display apparatus 200. The difference includes: the driving circuit 41 including a plurality of feedback terminals corresponding to the illumination units 21a-21n in a one-to-one relationship. The feedback terminals are electrically connected to the corresponding illumination unit 21a-21n respectively.

An operation method of the display apparatus 100 is described as follows.

When any LED Di of the specified illumination unit 20i is damaged, the corresponding comparator Ci generates a first level signal to the corresponding inverter Ti, which causes the corresponding inverter Ti to invert the first level signal into a second level signal as the first control signal. The corresponding transistor Qi turns off in response to the first control signal from the inverter Ti for cutting off the electrical connection between the driving circuit 41 and the corresponding illumination unit 21i, which causes the corresponding illumination unit 21i to stop emitting light. The illumination units beside the corresponding illumination unit 21i keep emitting light.

When all of the LED D1-Dn of the specified illumination unit 21i are in a normal state, the corresponding comparator Ci generates a second level signal to the corresponding inverter Ti, which causes the corresponding inverter Ti to invert the second level signal into the first level signal as the second control signal. The corresponding transistor Qi turns on for establishing the electrical connection between the driving circuit 41 and the corresponding illumination unit 21i, which cause the corresponding illumination unit 21i to emit light.

Based on the backlight driving module 40, when any LED of the backlight module 20 is damaged, the backlight driving module 40 cuts off the electrical connection between the driving circuit and the corresponding illumination unit contained the damaged LED for preventing the driving circuit from being damaged and keeping the remaining illumination units emitting light.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A display apparatus comprising:
   a display panel;
   a display driving module configured to drive the display panel to display images;
   a backlight module configured to provide plane light to the display panel, and comprising a plurality of illumination units; and
   a backlight driving module configured to drive the backlight module to emit plane light, the backlight driving module comprising:
   a driving circuit;
   a plurality of switching units, each of the switch units connected to exactly one of the illumination units and connecting the driving circuit with the connected illumination units; and
   a plurality of detecting units, each connected to exactly one of the switching units, and further connected to two of the illumination units simultaneously;
   wherein the detecting unit compares voltages of the connected illumination units and generates a control signal to the connected switch unit based on the comparing result for establishing or cutting off an electrical connection between the driving circuit and the illumination unit corresponding to the connected switch unit; and
   wherein the detecting module comprises a comparator and an inverter; a first input terminal of the comparator is electrically connected to the corresponding illumination unit, a second input terminal of the comparator is electrically connected to an adjacent illumination unit, and an output terminal of the comparator is electrically connected to an input terminal of the inverter; an output terminal of the inverter is electrically connected to the corresponding switching module.

2. The display apparatus of claim 1, wherein when the voltage of the corresponding illumination unit is less than the other illumination unit, the corresponding detecting unit generates a first control signal, the corresponding switching unit cuts off the electrical connection between the driving circuit and the corresponding illumination unit in response to the first control signal.

3. The display apparatus of claim 1, wherein when the voltage of the corresponding illumination unit is equal to the other illumination unit, the corresponding detecting unit generates a second control signal, the corresponding switching unit establishes the electrical connection between the driving circuit and the corresponding illumination unit.

4. The display apparatus of claim 1, wherein the switching module comprises a transistor; a gate of the transistor is electrically connected to the corresponding detecting unit; a source of the transistor is electrically connected to the corresponding illumination unit, and a drain of the transistor is electrically connected to the driving circuit.

5. The display apparatus of claim 1, wherein the driving circuit comprises a feedback terminal; first ends of the illumination units are electrically connected to the corresponding switching unit respectively; second ends of the illumination unit are electrically connected to the feedback terminal simultaneously.

6. The display apparatus of claim 1, wherein the driving circuit comprises a plurality of feedback terminals corresponding to the illumination units in an one-to-one relationship; first ends of the illumination units are electrically connected to the corresponding switching unit respectively; second ends of the illumination unit are electrically connected to the feedback terminal respectively.

7. A backlight driving module for driving a backlight module with a plurality of illumination units; the backlight driving module comprising:
   a driving circuit;
   a plurality of switching units, each of the switch units connecting the driving circuit with exactly one of the illumination units; and
   a plurality of detecting units connected to exactly one of the switch units, and further connected to two of the illumination units;
   wherein the detecting unit compares voltages of the connected illumination units and generates a control signal to the connected switch unit based on the comparing result for establishing or cutting off an electrical connection between the driving circuit and the illumination unit corresponding to the connected switch unit; and
   wherein the detecting module comprises a comparator and an inverter; a first input terminal of the comparator is electrically connected to the corresponding illumination unit, a second input terminal of the comparator is electrically connected to an adjacent illumination unit, and an output terminal of the comparator is electrically connected to an input terminal of the inverter; an output terminal of the inverter is electrically connected to the corresponding switching module.

8. The backlight driving module of claim 7, wherein when the voltage of the corresponding illumination unit is less than the other illumination unit, the corresponding detecting unit generates a first control signal, the corresponding switching unit cuts off the electrical connection between the driving circuit and the corresponding illumination unit in response to the first control signal.

9. The backlight driving module of claim 7, wherein when the voltage of the corresponding illumination unit is equal to the other illumination unit, the corresponding detecting unit generates a second control signal, the corresponding switching unit establishes the electrical connection between the driving circuit and the corresponding illumination unit.

10. The backlight driving module of claim 7, wherein the switching module comprises a transistor; a gate of the transistor is electrically connected to the corresponding detecting unit; a source of the transistor is electrically connected to the corresponding illumination unit, and a drain of the transistor is electrically connected to the driving circuit.

11. The backlight driving module of claim 7, wherein the driving circuit comprises a feedback terminal; first ends of the illumination units are electrically connected to the corresponding switching unit respectively; second ends of the illumination unit are electrically connected to the feedback terminal simultaneously.

12. The backlight driving module of claim 7, wherein the driving circuit comprises a plurality of feedback terminals corresponding to the illumination units in an one-to-one relationship; first ends of the illumination units are electrically connected to the corresponding switching unit respectively; second ends of the illumination unit are electrically connected to the feedback terminal respectively.

* * * * *